(12) United States Patent
Tanaka et al.

(10) Patent No.: US 10,561,163 B2
(45) Date of Patent: Feb. 18, 2020

(54) EXTRUDED NOODLE AND DIE PIECE FOR EXTRUDED NOODLE

(75) Inventors: Mitsuru Tanaka, Osaka (JP); Tatsuo Yamaya, Moriyama (JP); Takuo Nakazeko, Osaka (JP); Shinichi Nakagawa, Osaka (JP); Masahiro Oda, Osaka (JP)

(73) Assignee: NISSIN FOODS HOLDINGS CO., LTD., Osaka-shi (JP)

(*) Notice: Subject to any disclaimer, the term of this patent is extended or adjusted under 35 U.S.C. 154(b) by 499 days.

(21) Appl. No.: 13/996,156

(22) PCT Filed: Dec. 21, 2011

(86) PCT No.: PCT/JP2011/079730
§ 371 (c)(1),
(2), (4) Date: Jun. 20, 2013

(87) PCT Pub. No.: WO2012/086729
PCT Pub. Date: Jun. 28, 2012

(65) Prior Publication Data
US 2013/0302498 A1    Nov. 14, 2013

(30) Foreign Application Priority Data

Dec. 22, 2010  (JP) .................................. 2010-285529
Mar. 22, 2011  (JP) .................................. 2011-062823

(51) Int. Cl.
*A23L 1/16*    (2006.01)
*A23L 7/113*   (2016.01)
(Continued)

(52) U.S. Cl.
CPC ............... *A23L 7/113* (2016.08); *A21C 11/16* (2013.01); *A23L 7/109* (2016.08); *A23P 30/20* (2016.08); *A23V 2002/00* (2013.01); *Y10T 83/06* (2015.04)

(58) Field of Classification Search
USPC ......................................... 426/557, 516, 451
See application file for complete search history.

(56) References Cited

U.S. PATENT DOCUMENTS 4,495,214 A * 1/1985 Seltzer ...................... A23L 7/17
                                                              426/451
4,816,281 A * 3/1989 Moriyama et al. ........... 426/144
(Continued)

FOREIGN PATENT DOCUMENTS

CH              342185 A       11/1959
EM       001771981-0002        10/2010
(Continued)

OTHER PUBLICATIONS

Yazaki et al., "Manufacturing of Macaroni/Spaghetti", Kabushiki Kaisha Korin Shoin, Mar. 25, 1966, vol. 15, pp. 89-91, Tokyo, Japan.
(Continued)

Primary Examiner — Lien T Tran
(74) Attorney, Agent, or Firm — The Webb Law Firm (57) ABSTRACT

Disclosed is an extruded noodle having a hole extending therethrough in a longitudinal direction, wherein: the hole closes or contracts during boiling or rehydration in hot water; and the hole in a cross section of the noodle is configured such that a plurality of grooves are formed rotationally symmetrically about a center of the cross section, extending in an outer radial direction from the center of the cross section of the noodle.

6 Claims, 7 Drawing Sheets

(51) Int. Cl.
*A23P 30/20* (2016.01)
*A21C 11/16* (2006.01)
*A23L 7/109* (2016.01)

(56) References Cited

U.S. PATENT DOCUMENTS

| | | | |
|---|---|---|---|
| 5,728,418 A * | 3/1998 | Hauser et al. | 426/557 |
| 5,773,069 A | 6/1998 | Lian et al. | |
| 5,935,628 A | 8/1999 | Hauser et al. | |
| 2005/0271785 A1 * | 12/2005 | Hayes-Jacobson | A21C 11/163 426/549 |
| 2008/0075817 A1 | 3/2008 | Backus et al. | |
| 2009/0011099 A1 | 1/2009 | Kim et al. | |
| 2012/0251701 A1 * | 10/2012 | Park | A23L 7/109 426/557 |

FOREIGN PATENT DOCUMENTS

| | | |
|---|---|---|
| EP | 0350552 A1 | 1/1990 |
| EP | 0557139 A1 | 8/1993 |
| EP | 1147715 A1 | 10/2001 |
| JP | 364595 | 5/1961 |
| JP | 606172 A | 1/1985 |
| JP | 61239850 A | 10/1986 |
| JP | 63248366 A | 10/1988 |
| JP | 02200155 A | 8/1990 |
| JP | 411879 A | 1/1992 |
| JP | 04207166 A | 7/1992 |
| JP | 4211337 A | 8/1992 |
| JP | 6244886 A | 9/1993 |
| JP | 07246054 A | 9/1995 |
| JP | 856596 A | 3/1996 |
| JP | 10146161 A | 6/1998 |
| JP | 11151081 A | 6/1999 |
| JP | 200023630 A | 1/2000 |
| JP | 200117104 A | 1/2001 |
| JP | 2005034056 A | 2/2005 |
| JP | 2007049920 A | 3/2007 |
| RU | 2070800 C1 | 12/1996 |
| RU | 2389346 C1 | 5/2010 |

OTHER PUBLICATIONS

Yoshimoto, "Basic of Plastic Processing", The Society of Polymer Science, Mar. 25, 1982, pp. 265-266, Kogyo Chosakai Publishing Co., Ltd., Tokyo, Japan.

Wadchararat et al., "Characterization of Pregelatinized and Heat Moisture Treated Rice Flours," Kasetsart, J. (Nat. Sci.) (2006) 40 (Suppl), pp. 144-153.

Enciclopedia Della Cucina Italiana e Mediterranea No. 5, May 1987, pp. 149-152, Kabushiki Kaisha Dohosha Shuppan, Japan (English-language Abstract attached).

Kasahara, Kohei, "Practical Chemical Apparatus Drawing" Mar. 1976, pp. 22-24, Kogaku Tosho Kabusiki Kaisha. (English-language Abstract attached).

Quality Labeling Standards for Macaroni and Similar Products, Sep. 2011 (English-language Abstract attached).

* cited by examiner

EXTRUDED NOODLE AND DIE PIECE FOR EXTRUDED NOODLE

FIELD OF THE INVENTION

The present invention relates to an extruded noodles which features a reduced boiling time, and a method for manufacturing instant noodles obtained by drying the extruded noodles after pregelatinization, and a method for manufacturing dried noodles obtained by drying the extruded noodles without pregelatinization.

Furthermore, the present invention relates to a noodle extruder die piece used in manufacturing noodles provided with a through-hole in a longitudinal direction.

RELATED ART

Extruded noodles such as spaghetti and macaroni are formed by an extrusion pasta machine. In so doing, noodle dough is extruded through die holes provided at a tip of the pasta machine, by being deaerated or without being deaerated. The extruded noodles thus formed take a longer cooking time than so-called "cut noodles" produced by rolling noodle dough into a thin strip and cutting the thin strip. That is, raw noodles or dried noodles take time to cook (boil) while instant noodles take time to reconstitute (rehydrate in hot water). One of the reasons for this is that the extruded noodles, which are formed by being extruded through die holes at high pressure, have a fine noodle structure, making it hard for hot water to penetrate the noodles.

Especially in the case of instant noodles produced by drying extruded noodles after pregelatinization, if hot-air drying is used for a drying process, the noodles have very poor reconstitution characteristics and have to be very thin in order to be reconstituted by hot water (rehydrated in hot water) in about 3 to 5 minutes. Therefore, regarding nonfried instant noodles processed from noodles formed by extruding through die holes, no product as thick as spaghetti (about 1.7 mm in dried state) has so far been put on the market. Thus, there is demand for instant noodles (instant pasta) with good reconstitution characteristics (rapidly rehydratable in hot water) produced by an extrusion process.

As techniques for reducing the boiling time of extruded noodles, techniques for forming grooves on surfaces of the noodles have long been known. For example, techniques described in Patent Literatures 1, 2, 3, and 4 all involve forming deep grooves in surfaces of noodles.

Also, Patent Literature 5 describes a technique concerning instant noodles with good reconstitution characteristics (rapidly rehydratable in hot water). The technique involves forming grooves with an area of 10 to 35% of the sectional area of noodles produced by extrusion. Patent Literature 5 states that when reconstituted in hot water, the noodles become swollen by absorbing hot water, and thereby close the grooves in appearance, eliminating an odd feeling.

Figure 7:
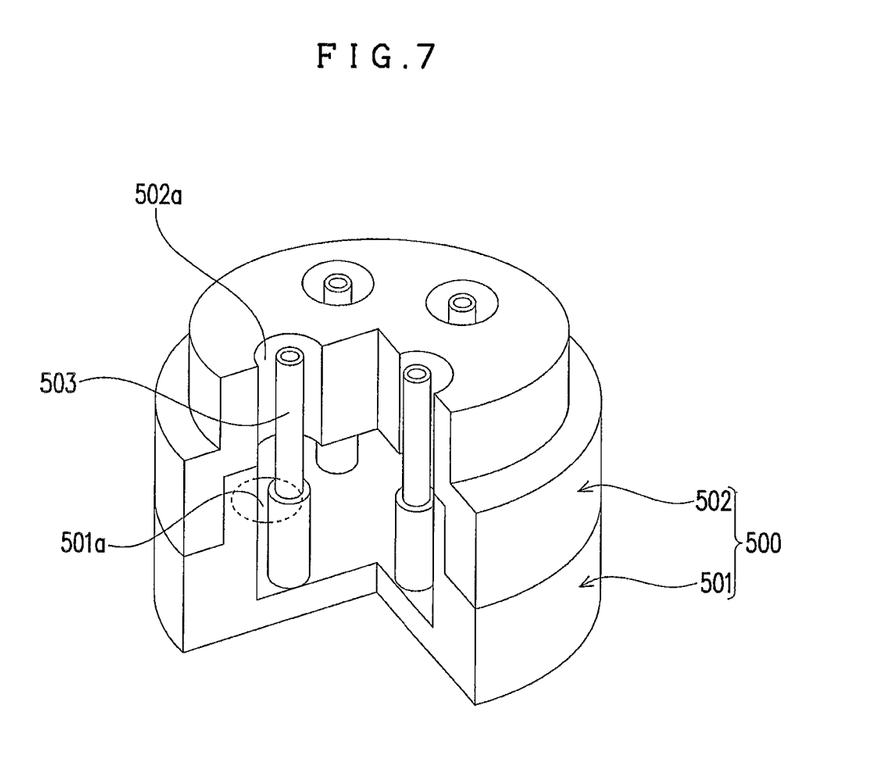
FIG. 7 is a vertical partially cutaway view showing an example of a conventional die piece.

Besides forming grooves on noodle surfaces, methods effective in reducing boiling time include a method of forming a through-hole in the noodles in a longitudinal direction, i.e., along the length of the noodles. Regarding extruded noodles, pierced pasta with a through-hole in the longitudinal direction includes various types of pasta typified by macaroni in the case of short pasta. As for long pasta, bucatini is known as a type of pierced noodles. Bucatini, which is considerably thicker than spaghetti, normally has a diameter of about 5 mm and has a circular through-hole formed in the center. Available methods for forming a circular through-hole in the center of noodles in this way include a method which involves extruding noodle dough using a die containing a large number of die pieces 500 such as shown in FIG. 7

The die is installed at a tip of an extruder or other extrusion machine and noodles are formed by extruding noodle dough through extrusion holes formed in each die piece. A pin is inserted in each extrusion hole, extending from a die piece on the side from which the noodle dough is pushed in. The through-hole is formed in each noodle at the location of the pin where the noodle dough is not extruded.

CITATION LIST

Patent Literature

Patent Literature 1: Japanese Patent Application Laid-Open. No. 60-6172
Patent Literature 2: Japanese Patent Application Laid-Open No. 4-211337
Patent Literature 3: Japanese Patent Application Laid-Open No. 10-146161
Patent Literature 4: Japanese Patent Application Laid-Open No. 2001-17104
Patent Literature 5: Japanese Patent Application Laid-Open No. 63-248366
Patent Literature 6: Japanese Patent Application Laid-Open No. 2007-49920
Patent Literature 7: Japanese Patent Publication No. 36-4595
Patent Literature 8: Japanese Patent Application Laid-Open No. 11-151081

SUMMARY OF THE INVENTION

Problems to be Solved by the Invention

However, when grooves are formed on the surfaces of noodles as described in the patent literatures, even if the noodles become swollen by absorbing hot water and thereby close the grooves in appearance, for example, as described in Patent Literature 5, the tissue of the grooves is not continuous with the other part. Thus, when the eater chews the noodles, displacement occurs around grooved portions, actually resulting in an odd mouth feel.

On the other hand, Patent Literature 6 describes extruded noodles with plural holes formed therein. However, in attempting to form plural holes in each noodle, it is difficult to form plural holes in the noodle because of the thinness of the noodle. Also, even if plural holes are formed, each individual hole has to be made very small. Small holes make it difficult for hot water to pass therethrough, resulting in poor reconstitution characteristics. On the other hand, if plural large holes are formed, the area of the holes in each noodle occupies a large proportion of the sectional area of the noodle, resulting in a poor mouth feel. Also, if a round hole is made in each noodle as with macaroni, the hole does not close easily and remains hollow, and consequently the holes are collapsed when the eater chews the noodles, resulting in an odd mouth feel without firm texture.

On the other hand, conventional examples of the die piece provided with hole-forming pins for use to form through-holes in the longitudinal direction of extruded noodles include a die piece 500 shown in FIG. 7. The die piece 500 includes an inlet-side piece 501 provided with holes 501a from which the noodle dough is pushed in and an extrusion-side piece 502 provided with holes 502a from which the noodles are extruded, where the inlet-side piece 501 and extrusion-side piece 502 are fitted with each other. In the conventional example in FIG. 7, four inlet holes 501a and four extrusion holes 502a are formed. The inlet holes 501a and extrusion holes 502a are displaced 45° from each other. In the conventional example, the pins 503 used to form the through-holes in the noodles are installed in the inlet-side piece 501 by fitting. Note that the conventional example in FIG. 7 is exemplary and that the numbers of the inlet holes, extrusion holes or the like may be set appropriately.

With thick noodles such as the macaroni and bucatini described above, since the through-hole formed is also relatively large, the pin 503 can be made thick. Therefore, the pin 503 may be structured to fit in the inlet-side piece 501. However, when one attempts to form a through-hole in thin noodles with a diameter of 3 mm or less (especially spaghetti and the like sized to be 2 mm or less in diameter), the through-hole becomes very thin, making it necessary to configure the pin 503 for use to form the through-hole to be extremely thin. Thus, with the fitting structure such as described above, the pin 503 is likely to fall out of the inlet-side piece 501, get bent, get broken, or cause other similar problems.

In relation to the die (die pieces) used to manufacture extruded noodles, conventional techniques for forming a through-hole in the longitudinal direction of the noodles include those described in Patent Literature 7 and Patent Literature 8. However, there is no conventional technique for forming a through-hole in thin noodles with a diameter of 3 mm or less.

The present invention has been made to solve the above problem. Accordingly, an object of the present invention is to obtain extruded noodles which have a short boiling time or good reconstitution characteristics (short rehydration time) and can be eaten without any odd mouth feel.

Another object of the present invention is to provide a noodle extruder die piece which allows thin noodles with a through-hole to be manufactured by extrusion. Still another object of the present invention is to provide a die piece used to obtain extruded noodles which has a short boiling time or good reconstitution characteristics as described above.

Means for Solving Problems

The present invention provides an extruded noodle having a hole extending therethrough in a longitudinal direction, wherein: wheat flour is essential as a raw material for the noodle; the hole closes or contracts during boiling or rehydration in hot water; and the hole in a cross section of the noodle is configured such that a plurality of grooves are formed rotationally symmetrically about a center of the cross section, extending in an outer radial direction from the center of the cross section of the noodle; the hole has an air gap at the center of the cross-section, the air gap being formed by the plurality of grooves overlapping each other; and the hole closes during boiling or rehydration in hot water, or contracts to such an extent as to allow the grooves excluding the air gap to be closed.

The extruded noodle configured as described above, wherein wheat flour is essential as a raw material, has a noodle structure provided with a hole which has a plurality of grooves extending in the outer radial direction from the center of the cross section of the noodle. This increases a surface area of the noodle, allowing hot water to quickly penetrate the entire noodle during boiling or rehydration in hot water. The hole, which closes or contracts during eating, is less liable to create an odd mouth feel which would be produced if the hole remained uncontracted.

In the present invention, the hole may be formed so as to occupy 2% to 15% of a sectional area of the noodle including the hole.

With the above configuration, the hole tends to close or contract during boiling or rehydration in hot water. Thus, during eating, the noodles are less liable to create an odd mouth feel such as produced by macaroni.

In the present invention, tips of the plurality of grooves may reach positions 30% to 70% of a distance from the center of the cross section of the noodle to an outer peripheral edge of the noodle.

The above configuration allows hot water to quickly penetrate the entire noodle and thereby reduces the boiling time or rehydration time of the noodles.

In the present invention, the plurality of grooves may be formed so as to have any of three-fold to eight-fold rotational symmetries.

With the above configuration, as the grooves are made to have any of three-fold to eight-fold rotational symmetries, the grooves are arranged radially from the center of the noodle in a uniform manner. Consequently, the noodles give a uniform mouth feel when chewed from any direction on an outer circumference by an eater. Also, the use of eight-or-less-fold symmetry makes it easy to produce a die used to extrude noodle dough.

In the present invention, the hole in the cross section of the noodle may be shaped to have a depressed portion which is located between tips of adjacent ones of the plurality of grooves and is recessed toward the center of the cross section of the noodle.

With the above configuration, since the noodle is shaped to have a depressed portion recessed toward the center of the cross section of the noodle, the hole tends to close or contract during boiling or rehydration of the extruded noodle in hot water.

In the present invention, tips of the plurality of grooves may have a curved surface.

With the above configuration, hot water reaches the tips of the grooves reliably, making it easy for the hot water to penetrate the noodle. This reduced the boiling time or rehydration time of the extruded noodles.

In the present invention, the cross section of the noodle may have a circular outer shape.

With the above configuration, since water can penetrate the entire noodle, the noodles are less liable to create an odd mouth feel such as produced when grooves are formed on a surface of the noodles.

The present invention provides a method for manufacturing instant noodles, comprising drying any of the extruded noodles described above after pregelatinization.

The manufacturing method can produce instant noodles having a noodle structure in which a hole is formed with a plurality of grooves extending in the outer radial direction from the center of the cross section of the noodle. This increases the surface area of the noodle, allowing hot water to quickly penetrate the entire noodle during boiling or rehydration in hot water. This causes the hole to close or contract during boiling or rehydration in hot water, making the noodles less liable to create an odd mouth feel which would be produced if the hole remained uncontracted. Also, since no odd mouth feel is produced and reconstitution characteristics during rehydration in hot water are improved remarkably in this way, thick extruded noodles (such as extruded spaghetti) not previously found among instant noodles can be manufactured.

The present invention provides a method for manufacturing dried noodles, comprising drying any of the extruded noodles described above without pregelatinization.

The manufacturing method can produce dried noodles having a noodle structure in which a hole is formed with a plurality of grooves extending in the outer radial direction from the center of the cross section of the noodle. This increases the surface area of the noodle, allowing hot water to quickly penetrate the entire noodle during boiling. Consequently, the cooking time can be reduced greatly compared to conventional extruded noodles (extruded pasta). This causes the hole to close or contract during boiling, making the noodles less liable to create an odd mouth feel which would be produced if the hole remained uncontracted.

The present invention provides a noodle extruder die piece used in manufacturing the aforesaid noodles provided with a through-hole in a longitudinal direction, the die piece comprising: an extrusion-side piece; and an inlet-side piece, wherein the extrusion-side piece includes an extrusion hole used to form noodles by extrusion, the inlet-side piece includes an inlet hole through which noodle dough is pushed in and a pin whose tip is inserted into the extrusion hole of the extrusion-side piece, and the tip of the pin is shaped in a cross section such that a plurality of protrusions are formed rotationally symmetrically about a center of the cross section, extending in an outer radial direction from the center of the cross section.

With this configuration, since the tip of the pin is shaped in the cross section such that a plurality of protrusions are formed rotationally symmetrically about the center of the cross section, extending in the outer radial direction from the center of the cross section, the extruded noodles formed by the die piece have a noodle structure in which a hole is formed with a plurality of grooves extending in the outer radial direction from the center of the cross section of the noodle. This increases the surface area of the noodle, allowing hot water to quickly penetrate the entire noodle during boiling or rehydration in hot water. The hole, which closes or contracts during eating, is less liable to create an odd mouth feel which would be produced if the hole remained uncontracted.

In the present invention, the pin is formed so as to be thicker at a base than at the tip and formed integrally with the inlet-side piece as part of the inlet-side piece.

Incidentally, the above-described concept of being "formed integrally" does not include integration via a joint or the like. That is, a formation method which forms the inlet-side piece by joining a pin formed separately from the inlet-side piece is excluded.

With this configuration, since the pin used to form a through-hole in noodles is formed integrally with the inlet-side piece as part of the inlet-side piece, there is no possibility that the pin will fall out. Moreover, being formed so as to be thicker at the base than at the tip, the pin can have strength in spite of its thinness.

The present invention provides a noodle extruder die piece, which is configured to manufacture noodles provided with a through-hole in a longitudinal direction, comprising: an extrusion-side piece; and an inlet-side piece, wherein the extrusion-side piece includes an extrusion hole used to form noodles by extrusion, the inlet-side piece includes an inlet hole through which noodle dough is pushed in and a pin whose tip is inserted into the extrusion hole of the extrusion-side piece, and the pin is configured to form the through-hole in an extruded noodle and formed so as to be thicker at the base than at the tip and formed integrally with the inlet-side piece as part of the inlet-side piece.

With this configuration, since the pin used to form a through-hole in noodles is formed integrally with the inlet-side piece as part of the inlet-side piece, there is no possibility that the pin will fall out. Moreover, being formed so as to be thicker at the base than at the tip, the pin can have strength in spite of its thinness.

In the present invention, the tip of the pin may be shaped in a cross section such that a plurality of protrusions are formed, extending in an outer radial direction from the center of the cross section.

With the above configuration, since a plurality of grooves are formed in the through-hole in the produced noodles by the plurality of protrusions formed on the pin, it is possible to manufacture noodles penetrated quickly by hot water during boiling or rehydration in hot water.

In the present invention, the plurality of protrusions may be formed so as to have any of three-fold to eight-fold rotational symmetries about a cross-sectional center of the pin; and the pin may be configured to have a depressed portion which is located between adjacent ones of the plurality of protrusions and may be recessed toward the cross-sectional center.

The above configuration makes it possible to provide a depressed shape between adjacent grooves in the through-hole in the produced noodles. This makes it easy to cause the through-hole to close or contract due to swelling of the noodles during boiling or rehydration in hot water. This makes it possible to manufacture noodles which produce a good mouth feel during eating.

In the present invention, the extrusion hole formed in the extrusion-side piece may be a through-hole with a circular cross section of 1 mm to 3 mm in diameter.

The above configuration makes it possible to manufacture thin noodles of 1 mm to 3 mm in diameter with a through-hole conventionally not available.

In the present invention, the extrusion hole formed in the extrusion-side piece may be a through-hole with a circular cross section of 1.5 mm to 2 mm in diameter; the tip of the pin may be shaped in a cross section such that a plurality of protrusions are formed, extending in the outer radial direction from the center of the cross section; and tips of the plurality of protrusions in a cross sectional shape may be at a distance of 0.5 mm or less from a cross-sectional center of the pin.

The above configuration makes it possible to place the tips of the grooves in the through-hole in the produced noodles close to the cross-sectional center of the noodles. Consequently, surroundings of the through-hole contracted due to swelling of the noodles during boiling or rehydration in hot water become less liable to be displaced during eating, making it possible to manufacture noodles which produce a good mouth feel during eating.

Also, the present invention provides a method for manufacturing the noodle extruder die piece according to the present invention, wherein the inlet-side piece is cut out of a single piece of metal blank by a machining center.

The manufacturing method makes it possible to manufacture a noodle extruder die piece capable of forming thin noodles by precision micromachining technology using a typical machine tool.

Also, the present invention provides a method for manufacturing extruded noodles, comprising extruding noodles using any one of the noodle extruder die piece described above.

The manufacturing method makes it easy to manufacture thin noodles with a through-hole by extrusion.

Advantageous Effects of the Invention

According to the present invention, the existence of the hole in the center of noodle allows hot water to quickly penetrate the entire noodle. This reduces the boiling time of raw noodles or dried noodles. Also, instant noodles have good reconstitution characteristics (are rehydrated quickly in hot water) not only when cooked by boiling, but also when eaten after rehydration in hot water. Moreover, the present invention provides a far better mouth feel than do conventional noodles with grooves formed on the surface or noodles with plural holes formed therein.

Also, since there is no possibility that the pin formed on the inlet-side piece will fall out and the pin can be made strong in spite of its thinness as well, the present invention can provide a noodle extruder die piece which allows thin noodles with a through-hole to be manufactured by extrusion.

BRIEF DESCRIPTION OF THE DRAWINGS

FIGS. 1 (A) to 1(C) show sectional shapes of a noodle according to an embodiment of the present invention, where FIG. 1(A) shows a state before a hot-water passage hole closes or contracts, FIG. 1(B) shows a state after the hot-water passage hole closes, and FIG. 1(C), shows a state after the hot-water passage hole contracts.

FIGS. 4(A) to 4(G) show a the piece according to an embodiment of the present invention, where FIG. 4(A) is a plan view, FIG. 4(B) is a perspective view, FIG. 4(C) is a front view, FIG. 4(D) is an end view taken in the direction of arrow A-A in FIG. 4(C), FIG. 4(E) is a side view, FIG. 4(F) is a back view, and FIG. 4(G) is an enlarged lateral end view of a tip of a pin.

FIGS. 6(A) to 6(C) show the die according to the embodiment shown in FIG. 4, where FIG. 6(A) is a front view, FIG. 6(B) is a plan view, and FIG. 6(C) is an end view taken in the direction of arrow B-B in FIG. 6(A).

DESCRIPTION OF EMBODIMENTS

Now, the present invention will be described by citing an exemplary embodiment of extruded noodles. Although the present embodiment concerns pasta, the present invention is not limited to pasta and is applicable to various types of noodles (extruded noodles) obtained by extrusion.

In the case of pasta, wheat flour is essential as a raw material for noodles. For spaghetti, in particular, preferably durum wheat flour is used. Then, raw flour for the noodles may be prepared by adding grain flour such as buckwheat flour, rice flour, or barley flour, or starch, as required. Also, auxiliary raw materials such as salt, a noodle conditioner, or the white of an egg may be added as required. The raw flour for the noodles and kneading water are kneaded well to prepare noodle dough.

Noodles are formed by extruding the noodle dough under pressure through holes in a die mounted at a tip of an extruder pasta machine. As shown in FIG. 6, a die 300 according to the present embodiment is equipped with noodle extruder die pieces 3, each of which has a pin 323 installed in a center of each hole (see FIG. 4). Consequently, a hole identical in sectional shape as the pin 323 is formed in each noodle extruded. This hole makes up a hot-water passage hole 2 described later. Incidentally, the noodles may be formed using an apparatus which continuously performs the process from kneading of the raw flour for the noodles and kneading water to extrusion.

Figure 1A:
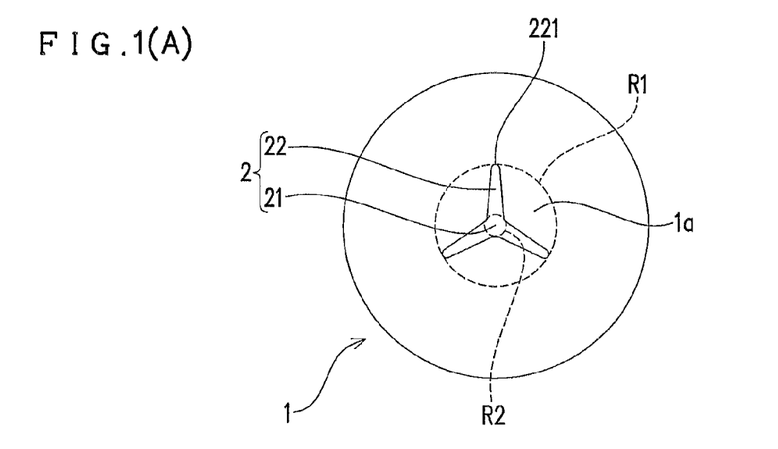

A cross-sectional shape of a noodle after extrusion is, for example, as shown in FIG. 1(A). The cross section of the noodle 1 has a circular outer shape. The hot-water passage hole 2 in the cross section of the noodle 1 is configured such that a plurality of grooves 22 are formed rotationally symmetrically about a center of the cross section, extending in the outer radial direction (extending radially outward) from the center of the noodle 1. A portion where the plurality of grooves 22 overlap each other forms an air gap 21. The hot-water passage hole 2 closes or contracts due to swelling of the noodles 1 during boiling or rehydration in hot water. The grooves 22 may be made up of a single shape formed rotationally symmetrically as shown in FIG. 1(A) or grooves 22a and 22b of different shapes each of which is formed rotationally symmetrically as shown, for example, in FIG. 2(C).

Figure 1B:
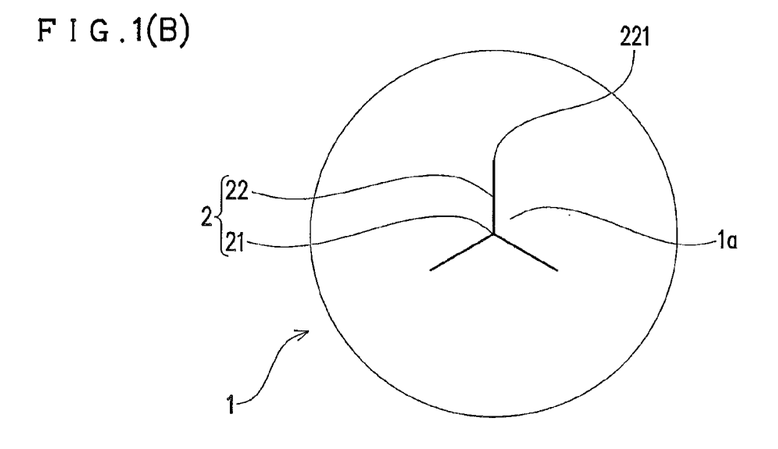
Figure 1C:
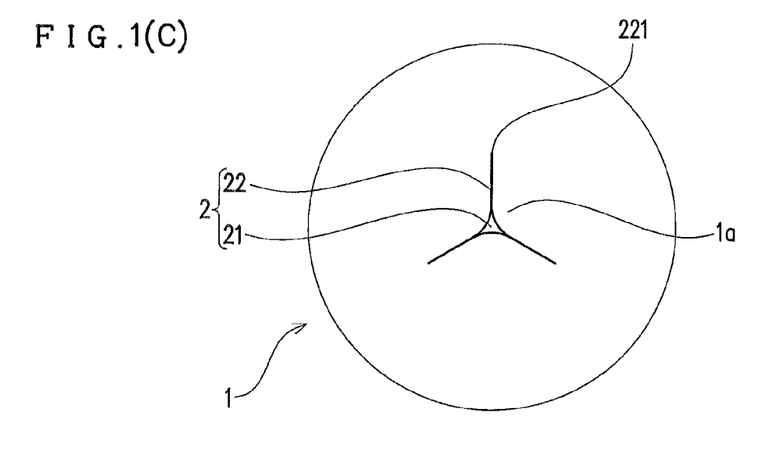

Preferably, the hot-water passage hole 2 is closed as a result of boiling or rehydration in hot water, as shown in FIG. 1(B). However, depending on the hot-water temperature or on the boiling time or rehydration time, the hot-water passage hole 2 does not close completely in some cases. Even if the hot-water passage hole 2 does not close completely, it is sufficient if the hot-water passage hole 2 contracts to a size small enough for the eater to have a springy mouth feel typical of spaghetti rather than a macaroni-like mouth feel without firm texture. Specifically, in a state shown in FIG. 1(A), it is sufficient if the grooves 22 excluding the air gap 21 are almost closed as a result of boiling or rehydration in hot water as shown in FIG. 1(C), leaving only a slight amount of air gap 21.

The hot-water passage hole 2 shown in FIG. 1(A) has a "Y shape" made up of three grooves 22. The number of grooves is not limited to three, but too large a number of grooves will make it difficult to build the die, and thus desirably the grooves 22 are formed so as to have any of three-fold to eight-fold rotational symmetries, and especially preferably a three-fold or four-fold symmetry. When the grooves are formed so as to have a rotational symmetry in this way, the noodles become free of the disadvantages of creating a different mouth feel depending on the direction in which the noodles are chewed by the eater.

The hot-water passage hole 2 shown in FIG. 1(A) is formed so as to touch a virtual double circle around the center of the cross section of the noodle 1, the virtual double circle being made up of large and small circles (first circle R1 and second circle R2) indicated by broken lines. The first circle R1 is a virtual circle joining tips 221 of the three grooves 22 in the hot-water passage hole 2 while the second circle R2 is a virtual circle inscribed in the hot-water passage hole 2. That is, the sectional area (cross sectional area) of the hot-water passage hole 2 is smaller than the sectional area of the first circle R1, and larger than the sectional area of the second circle R2. As shown in FIG. 1(A), between adjacent ones of the plurality of grooves 22, surroundings of the hot-water passage hole 2 protrude toward the center of the cross section of the noodle 1. That is, there is a depressed portion 1a shaped to be recessed deeper toward the center than the first circle R1. The depressed portion 1a swells toward the air gap 21, i.e., toward the center of the cross section of the noodle 1 during boiling or rehydration in hot water. During eating, space in the air gap 21 and grooves 22 vanishes (see FIG. 1(B)) or becomes very small (see FIG. 1(C)), causing the hot-water passage hole 2 to close or contract. Thus, the hot-water passage hole 2 shown in FIG. 1(A) is far more liable to contract due to swelling of the noodle 1 than a hot-water passage hole equal in diameter to the first circle R1. Also, since the grooves 22 extend in an outer radial direction, accordingly causing a larger quantity of hot water to pass through the hot-water passage hole 2 than a hot-water passage hole equal in diameter to the second circle R2, the cooking (boiling) time or reconstitution (rehydration) time can be reduced.

The grooves 22 have a tapered shape with their width getting smaller toward a radially outer side, and preferably, the tips 221 of the grooves 22 have a curved (rounded) surface. Desirably the curved surface has a radius of curvature (R) of 0.01 mm to 0.1 mm, and more desirably 0.025 mm to 0.075 mm. As the tips 221 of the grooves 22 are shaped to have a curved surface, the noodles become less liable to cracking when dried, it becomes easy for hot water to enter the hot-water passage hole 2, and the noodles are boiled or rehydrated quickly in hot water. However, if the radius of curvature (R) is increased too much, it becomes difficult for the hole to close, which might result in a macaroni-like mouth feel, and thus preferably the size is within the range described above.

Besides, in order to cause the hot-water passage hole 2 to close or effectively contract, preferably the hot-water passage hole 2 is formed so as to occupy 1% to 20% of the sectional area of the noodle 1 including the hot-water passage hole 2, more preferably 2% to 15%, and especially preferably 3% to 12%. Also, in cross-sectional shape, preferably the hot-water passage hole 2 has a tapered shape with its width getting smaller toward the radially outer side. Also, in order to cause hot water to quickly penetrate the entire noodle and in order to reduce the cooking time or rehydration time, preferably the tips 221 of the grooves 22 reach positions 25% to 75% of a distance from the center of the cross section to an outer peripheral edge of the noodle 1, more preferably 30% to 70%, and especially preferably 35% to 65%. However, if the distance of the tips 221 of the grooves 22 from the center exceeds 70% of the distance to an outer circumference of the noodle, dried noodles or instant noodles might have a problem in that the noodles crack easily when dried.

Figure 2A:
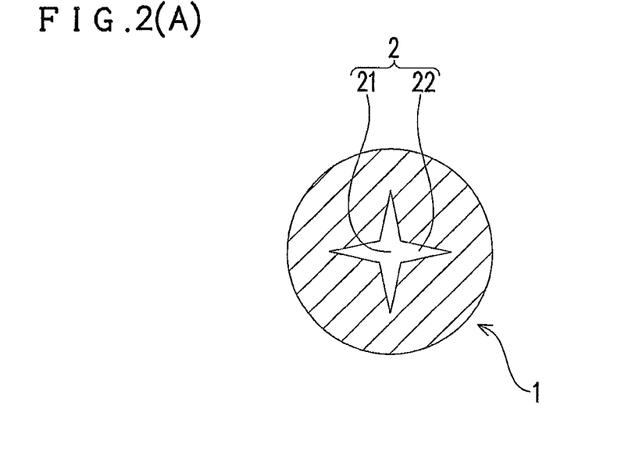
FIGS. 2(A) to 2(C) are cross-sectional views showing exemplary sectional shapes of a noodle according to another embodiment.
Figure 2B:
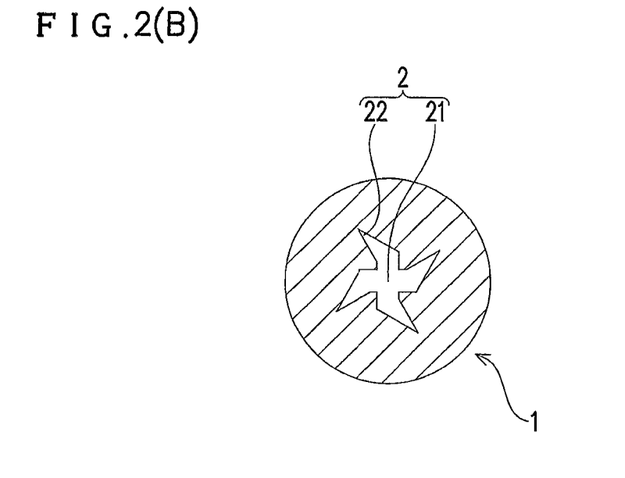
Figure 2C:
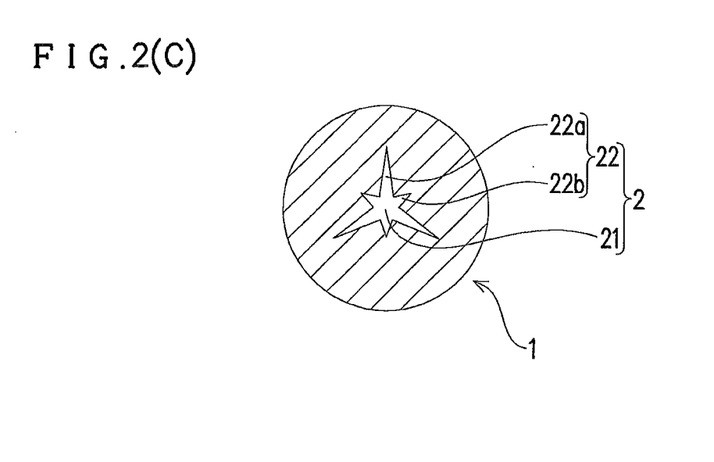

Other exemplary shapes of the hot-water passage hole 2 will be described with reference to FIG. 2. The shape shown in FIG. 2(A) is a cruciform of four-fold rotational symmetry. The shape shown in FIG. 2(B) similarly displays four-fold rotational symmetry, but is a modified cruciform, in which the grooves 22 extend by being displaced in a circumferential direction rather than extending in the outer radial direction from the air gap 21 as in the case of FIG. 2(A). The shape shown in FIG. 2(C) is made up of large grooves 22a and small grooves 22b. Both the set of large grooves 22a and set of small grooves 22b display three-fold rotational symmetries, and the large grooves 22a and small grooves 22b are arranged alternately. In this way, the hot-water passage hole 2 can have various shapes.

The noodles 1 extruded from the die in the manner described above are raw noodles (raw pasta, according to the present embodiment). The raw noodles are cooked by being boiled as they are, and become ready to eat. To produce dried noodles (dried pasta), raw noodles are dried (under humidity-controlled conditions) by being hung on a pole. The drying is carried out for 20 hours at a temperature of 50° C. or for 12 hours at a temperature of 70° C. after preliminary drying for 1 to 2 hours. However, the drying conditions cited here are strictly exemplary and are not restrictive. After the drying, the noodles are cut into appropriate length (normally around 25 cm) to become strings of dried noodles (spaghetti or the like) generally available on the market. The dried noodles are cooked by being boiled in boiling water. Although processing of long pasta has been described above, needless to say, short pasta can be processed as well.

In the case of instant noodles (instant pasta), raw noodles are dried after pregelatinization. The pregelatinization is performed by boiling or steaming the noodles. Combination of boiling and steaming may be employed. Incidentally, to bring out characteristics of spaghetti, boiling is advisable. After the pregelatinization process, the noodles are drained and dried. Available drying methods include hot-air drying, microwave drying, high-temperature flash drying, freeze-drying, and drying by means of frying (deep-frying). However, to bring out characteristics of spaghetti, a method other than frying is advisable. Incidentally, noodles once produced as dried noodles in the manner described above may be boiled, thereby pregelatinized, and then dried to produce instant noodles. The noodles are dried with each serving of pregelatinized noodles being contained in a retainer. The drying takes about 30 minutes to 2 hours at about 80 to 120° C. in the case of hot-air drying.

In the case of noodles with grooves formed on their surface as is conventionally the case (the techniques described above in the patent literatures) when the noodles are dried to produce dried noodles or instant noodles, since there is a large difference in drying speed between surroundings of grooves and other part, the noodles tend to be dried unevenly. In contrast, in the case of the noodles 1 according to the present embodiment, since the outer shape of the cross section is circular, the noodles can be dried evenly and are resistant to warping and the like.

To eat instant noodles, bagged noodles are generally boiled in boiling water as in the case of dried noodles. Cup noodles generally get ready to eat 3 to 5 minutes after hot water is poured into the cup and a lid is put on the cup.

According to the present embodiment, the noodles 1 have a noodle structure in which the hot-water passage hole 2 is formed in the center of the noodles 1, increasing the surface area of the noodles 1 and allowing hot water to quickly penetrate the entire noodles 1. This reduces the boiling time of raw noodles or dried noodles, which can be cooked in about ⅘ to ⅔ the time required to cook noodles which have an equal thickness but no hot-water passage hole. Also, in the case of instant noodles, not only when cooked by boiling, but also when eaten after being rehydrated in hot water, noodles as thick as spaghetti (about 1.7 mm in dried state), which are impossible to reconstitute in the case of noodles without a hole in the center, can be rehydrated satisfactorily.

Moreover, the noodles 1 according to the present embodiment provide a far better mouth feel than conventional noodles with grooves formed on the surface. This is because whereas the noodles with grooves formed on the surface lacks noodle tissue in the grooves, resulting in unevenness on the noodle surface and causing displacement when the noodles are chewed, the noodle structure according to the present embodiment is free of this problem.

Figure 3:
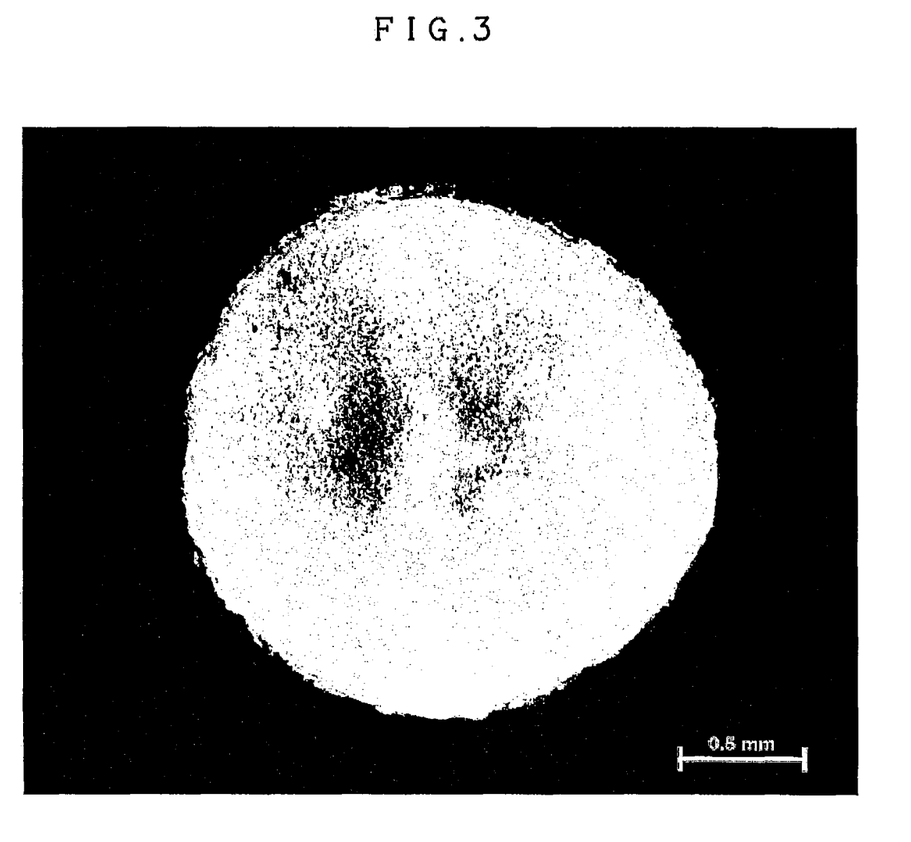
FIG. 3 is a photomicrograph taken of an actually produced extruded noodle for the purpose of checking, showing a state corresponding to FIG. 1(B).

Also, since the present embodiment has a structure in which the grooves 22 are formed in each noodle 1 rotationally symmetrically around the center, when the noodles 1 are cooked by boiling (in the case of raw noodles or dried noodles) or reconstituted in hot water (in the case of instant noodles), the hot-water passage hole 2 in the noodles 1 contracts (closes or becomes very narrow) as shown in FIGS. 1(B), 1(C), and 3, making the noodles 1 substantially the same as solid noodles and thereby providing a springy mouth feel typical of spaghetti rather than a mouth feel without firm texture such as produced by macaroni in which a large-diameter hole is provided. That is, the noodles 1 according to the present embodiment have a noodle structure essentially different from that of noodles, such as macaroni, in which the hole remains even after cooking, and thus provide a different mouth feel as well.

With the technique described in Patent Literature 6, plural holes are made by avoiding the center of the noodle. In contrast, according to the present embodiment, the hot-water passage hole 2 with plural grooves 22 is made in the center of the noodle 1. Whereas it is extremely difficult to produce a die when plural holes are made in each thin noodle as described in Patent Literature 6, the extruded noodles according to the present invention are advantageous in that the structure of the die can be simplified.

The inventors actually produced and checked the extruded noodles according to the present invention, and this will be described next.

Noodle dough was prepared by using 1 kg of durum wheat flour as raw flour, adding 300 ml of kneading water, and kneading the mixture well in a mixer, and was input in a pasta machine. Dies of various shapes (see FIG. 4 regarding examples) described below were set on the pasta machine and the noodle dough was extruded at a pressure of 80 to 130 Bar to obtain extruded raw noodles.

Example 1

A die with a hole diameter of 1.9 mm and with a pin Y-shaped in cross section was used; R at the tip of the pin was 0.05 mm; the tip of the pin (the radius of a Y-shaped circumscribed circle) was 0.4 mm from the center; and a bend of the pin (the radius of a Y-shaped inscribed circle) was 0.2 mm from the center.

Example 2

A die with a hole diameter of 1.9 mm and with a pin Y-shaped in cross section was used; R at the tip of the pin was 0.03 mm; the tip of the pin (the radius of a Y-shaped circumscribed circle) was 0.4 mm from the center; and a bend of the pin (the radius of a Y-shaped inscribed circle) was 0.2 mm from the center.

Comparative Example 1

A die with a hole diameter of 1.9 mm and without a pin was used.

In Example 1, Example 2, and Comparative Example 1, extruded raw noodles (pasta) obtained using the dies shaped as described above, respectively, were cut into a length of 25 cm, 100 g each of the extruded raw noodles were put in boiling water and boiled by keeping the hot water from boiling over. Then, three skilled panelists counted the time at which an optimal mouth feel was obtained and determined optimal reconstitution times (boiling/cooking time) at 15-second intervals.

As a result, 4 minutes 45 seconds was required in Example 1, 5 minutes 0 seconds was required in Example 2, and 6 minutes and 30 seconds was required in Comparative Example 1, demonstrating that the use of the shapes according to the present invention made it possible to cook raw noodles in about ¾ the amount of time. When visually observed by the panelists, the holes in the end faces of the boiled pasta were almost closed. Also, the panelists had a mouth feel similar to that of pasta without a hole.

Next, the raw noodles of Example 1, Example 2, and Comparative Example 1 were dried on a preliminary basis by being hung on a pole for 1 to 2 hours, then dried for 12 hours at a temperature of 70° C., and cut into a length of 25 cm to produce strings of dried noodles. Then, 100 g each of the dried noodles were put in boiling water as Example 3, Example 4, and Comparative Example 2 and boiled by keeping the hot water from boiling over. Then, three skilled panelists counted the time at which an optimal mouth feel was obtained and determined optimal reconstitution times (boiling/cooking time) at 15-second intervals.

As a result, 10 minutes 30 seconds was required in Example 3, 11 minutes 0 seconds was required in Example 4, and 15 minutes and 0 seconds was required in Comparative Example 2, demonstrating that the use of the shapes according to the present invention made it possible to cook dried noodles in about 70% of the amount of time. When visually observed by the panelists, the holes in the end faces of the boiled pasta were almost closed. Also, the panelists had a mouth feel similar to that of pasta without a hole.

Noodle dough was prepared by using 800 g of durum wheat flour and 200 g of starch as raw flour, adding 365 ml of kneading water with 20 g of salt and 3 g of tri-sodium phosphate dissolved therein, and kneading the mixture well in a mixer, and was input in a pasta machine. Dies of various shapes (see FIG. 4 regarding examples) described below were set on the pasta machine and the noodle dough was extruded at a pressure of 80 to 130 Bar to obtain extruded raw noodles.

Example 5

A die with a hole diameter of 1.9 mm and with a pin Y-shaped in cross section was used; R at the tip of the pin was 0.05 mm; the tip of the pin (the radius of a Y-shaped circumscribed circle) was 0.4 mm from the center; and a bend of the pin (the radius of a Y-shaped inscribed circle) was 0.2 mm from the center.

Example 6

A die with a hole diameter of 1.9 mm and with a pin Y-shaped in cross section was used; R at the tip of the pin was 0.03 mm; the tip of the pin (the radius of a Y-shaped circumscribed circle) was 0.4 mm from the center; and a bend of the pin (the radius of a Y-shaped inscribed circle) was 0.2 mm from the center.

Comparative Example 3

A die with a hole diameter of 1.9 mm and with a pin circular in cross section and 0.7 mm in diameter was used.

Comparative Example 4

A die with a hole diameter of 1.9 mm and with a pin circular in cross section and 0.3 mm in diameter was used.

Comparative Example 5

A die with a hole diameter of 1.9 mm and without a pin was used.

The above-described extruded raw noodles (pasta) with a hole Y-shaped in cross section (Examples 5 and 6), extruded raw noodles (pasta) with a circular hole (Comparative Examples 3 and 4), and extruded raw noodles (pasta) without a hole (Comparative Example 5) were cut into a length of 30 cm, pregelatinized by being boiled in boiling water of 100° C. for 90 seconds, and then cooled in tap water for 30 seconds. Then the noodles were immersed for 15 seconds in an aqueous solution (seasoning solution) prepared by dissolving 30 g of salt and 4 g of sodium glutamate in 1 liter of water, 195 g of noodles were put in a retainer for each serving, and the noodles were dried in a hot air drier at temperatures of 85 to 105° C. for 45 minutes. The hot-air dried, non-fried noodles produced in this way were put in styrol containers after cooling as cups of non-fried noodles (instant spaghetti). After hot water was poured into the containers, the containers were allowed to stand for 5 minutes with a lid put thereon, and then the noodles were eaten by three skilled panelists.

Results confirmed that the noodles of Examples 5 and 6 had good reconstitution characteristics and provided a good mouth feel. On the other hand, the noodles of Comparative Example 5, which did not have a hot-water passage hole, were hardly eatable with their inner part utterly failing to have been reconstituted. Of the noodles of Comparative Examples 3 and 4, which had a circular hot-water passage hole, the noodles of Comparative Example 4 had poor reconstitution characteristics probably because of a small hole diameter through which it was difficult for hot water to pass, also failed to be rehydrated, and thus provided a poor mouth feel. The noodles of Comparative Example 3, which had a larger hole diameter than those of Comparative Example 2, had good reconstitution characteristics. However, the hot-water passage hole 2 did not close even after reconstitution and the large circular hole produced a macaroni-like mouth feel, which created an odd feeling as spaghetti.

Next, the present invention will be described by citing an exemplary embodiment of the noodle extruder die piece used to form the extruded noodles described above. In the following, the left side and right side in FIG. 4(D) will be described as being the front side and back side, respectively.

The noodle extruder die piece 3 (hereinafter referred to as the "die piece") according to the present embodiment includes an extrusion-side piece 31 and an inlet-side piece 32. The extrusion-side piece 31 and inlet-side piece 32 are integrated by being fitted together. Alternatively, the extrusion-side piece 31 and inlet-side piece 32 may be integrated by being screwed together or the like.

The extrusion-side piece 31 according to the present embodiment is made up of two parts: a core portion 31a made of resin and an outer portion 31b made of metal. According to the present embodiment, the core portion 31a made of resin (specifically, fluorine resin) is used to make surfaces of extruded noodles smooth. Conversely, in order to make sauce readily cling to the noodles, such a material or surface structure that will make the noodle surfaces coarse may be used for the core portion 31a. The outer portion 31b covers the core portion 31a, excluding some part on the front side of the inlet-side piece 32 and surroundings of an opening portion of an extrusion hole 311 (described later) in the core portion 31a. Note that the extrusion-side piece 31 may be made of a single part rather than two parts such as described above.

Figure 4A:
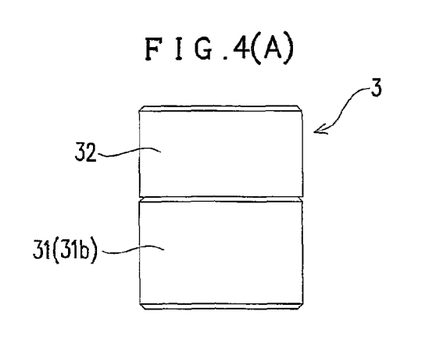
Figure 4B:
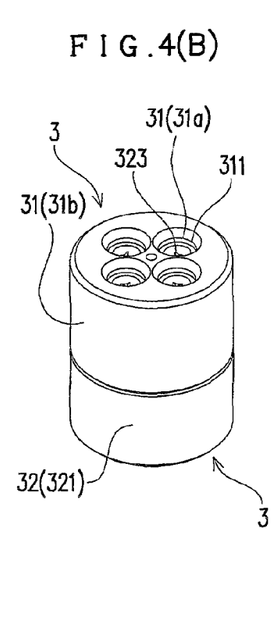
Figures 4C, 4D:
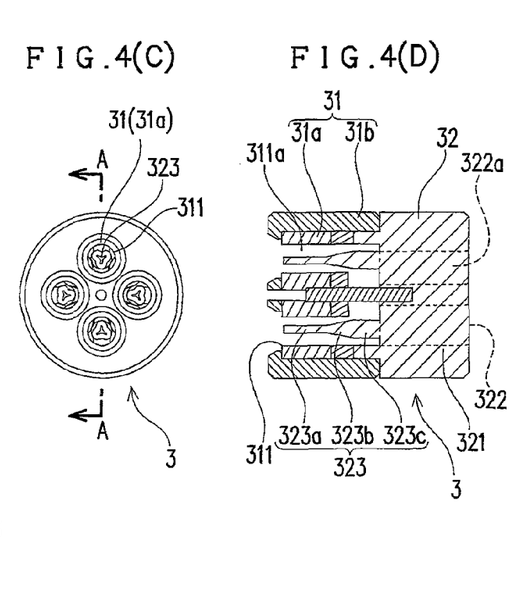
Figure 4E:
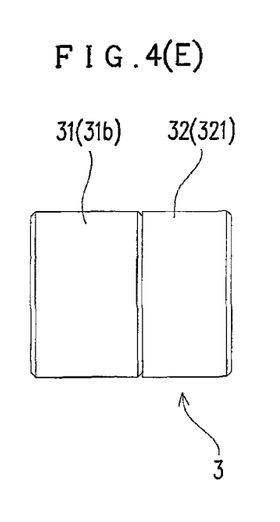

The extrusion-side piece 31 includes an extrusion hole 311 used to form noodles by extrusion. As shown in FIGS. 4(B) to 4(D), the extrusion hole 311 includes a space 311a making up a through-hole which has a circular transversal cross section and opens on the front side of the extrusion-side piece 31 (more specifically, the core portion 31a). As shown in FIG. 4(D), noodle dough is passed through the space 311a to form noodles. As shown in FIG. 4(C), four extrusion holes 311 are formed at 90-degree intervals around a virtual axis passing through the center of the die piece 3. Preferably, the extrusion hole 311, which is a through-hole, is sized to be 3 mm or less to form thin noodles, and especially 1 mm to 2 mm in diameter. According to the present embodiment, the diameter is 1.9 mm. Also, although the cross-sectional shape of the through-hole is constant along the axial direction, the hole diameter may change along the axial direction, for example, by being tapered toward the tip.

Figure 4F:
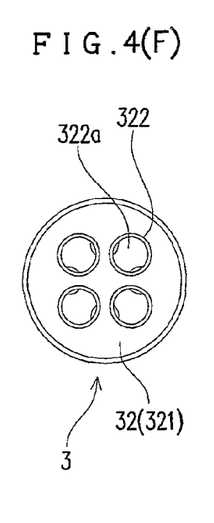

The inlet-side piece 32 has an inlet hole 322 through which noodle dough is pushed in and a pin 323 whose tip 323a is inserted into the space 311a in the extrusion hole 311 of the extrusion-side piece 31. The inlet hole 322 is a through-hole which has a circular cross section and opens on the back side of the inlet-side piece 32. As shown in FIG. 4(F), the inlet hole 322 has a space 322a for the noodle dough to pass through. The space 322a is communicated with the space 311a in the extrusion hole 311. According to the present embodiment, four inlet holes 322 are formed at 90-degree intervals around the virtual axis passing through the center of the die piece 3 as in the case of the extrusion hole 311 described above. As shown in FIGS. 4(C) and 4(F), the inlet holes 322 are displaced 45° from the extrusion holes 311.

According to the present embodiment, the inlet holes 322 are structured as described above. However, it is sufficient if the inlet holes 322 can supply sufficient amounts of noodle dough uniformly to each extrusion hole 311. Therefore, the inlet hole 322 may have another shape as long as a sufficient amount of noodle dough can be supplied uniformly to each extrusion hole 311, and it is not strictly necessary to install the inlet holes 322 at four locations as with the present embodiment or it is not essential to install the inlet holes 322 by being displaced 45°.

The pin 323 is configured to be solid, extending from a base 321 to the front side, where the base 321 is a back-side portion of the inlet-side piece 32. The tip 323a and base (made up of a first base portion 323b and second base portion 323c) are formed integrally as part of the inlet-side piece 32. According to the present embodiment, four pins 323 are installed per die piece 3. As shown in FIGS. 4(C) and 4(D), when the extrusion-side piece 31 and inlet-side piece 32 are integrated by being fitted together, the pins 323 are located in the respective spaces 311a in the extrusion hole 311.

Figure 4G:
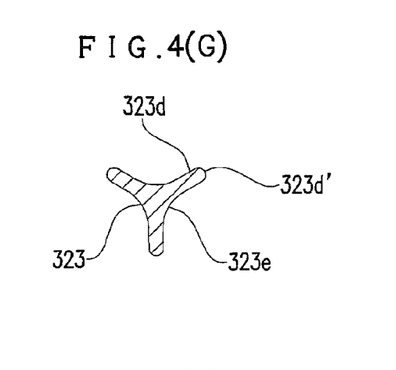

According to the present embodiment, in which the extrusion hole 311 is sized to be 1.9 mm, that portion of the pin 323 which extends 3 mm from the front side toward the back side is shaped to be straight. That is, the tip 323a has a constant cross-sectional shape. The cross-sectional shape of the tip 323a is a "Y shape" such as shown in FIGS. 4(C) and 4(G) and the distance from the cross-sectional center of the pin 323 to a tip 323*d'* (see FIG. 4(G)) is 0.4 mm.

That portion of the pin 323 which extends 3 mm to 5 mm from the front side toward the back side is the first base portion 323*b*. The first base portion 323*b* is tapered, increasing 0.3 mm in circumradius such that the cross-sectional area will increase toward the back side. The cross-sectional shape of the first base portion 323*b* according to the present embodiment is configured such that the "Y shape" described above will increasingly expand outward along with approach toward the back side, increasing the radius of the tip 323*d'* of a protrusion 323*d* (see FIG. 4(G)) in the cross-sectional shape.

The portion located more than 5 mm away from the front side of the pin 323 and extends to the back side is the second base portion 323*c*. The second base portion 323*c* according to the present embodiment is cylindrical in cross-sectional shape and 1.4 mm in diameter.

As described above, the pin 323 is formed integrally as part of the inlet-side piece 32. Consequently, unlike a conventional fitting structure (pin 503 in FIG. 7), there is no possibility that the pin 323 will fall out. Moreover, since the base (first base portion 323*b* and second base portion 323*c*) of the pin 323 is formed so as to be thicker than the tip 323*a*, the pin 323 has strength as a whole in spite of its thinness, making the pin 323 resistant to bending or breakage. Also, when noodles 1 are extruded from the die piece 3, the pin 323 is less liable to sway or vibrate under the pressure of the noodle dough.

According to the present embodiment, the tip 323*a* of the pin 323 is shaped in the cross section such that a plurality of protrusions 323*d* are formed, extending in the outer radial direction from the center of the cross section as shown in FIG. 4(G). Preferably, the plurality of protrusions 323*d* are formed so as to have any of three-fold to eight-fold rotational symmetries (three-fold symmetry, according to the embodiment in FIG. 4) about the cross-sectional center of the pin 323. Also, preferably, the pin has a depressed portion 323*e* which is located between adjacent protrusions 323*d* and is recessed toward the cross-sectional center. The cross-sectional shape of the tip 323*a* according to the present embodiment is a "Y shape," which has a three-fold rotational symmetry.

The tip 323*a* is configured such that one of the three protrusions 323*d* extending in three directions at 120-degree intervals will turn to the virtual axis passing through the center of the die piece 3. The protrusions 323*d* form a Y shape in the cross-sectional shape. Also, according to the present embodiment, as can be seen from the relationships shown in FIGS. 4(C) and 4(F), there is such a positional relationship that the depressed portion 323*e* between two adjacent ones of the protrusions 323*d* making up the Y shape will face a position extending from the inlet hole 322 in the inlet-side piece 32, but alternatively there may be such a positional relationship that one of the protrusions 323*d* will face a position extending from the inlet hole 322. Such a positional relationship is likely to reduce the resistance against the noodle dough coming into contact with the tip 323*a*.

Since the inlet-side piece 32 and pin 323 are formed integrally as described above, even if the pin 323 has a relatively complex shapes such as the Y shape, the die pieces 3 can be produced by a typical machine tool such as a machining center described later. The first base portion 323*b* and second base portion 323*c* may have respective cross-sectional shapes symmetrical with the cross-sectional shape of the tip 323*a* or otherwise identical with the shape of the tip 323*a*, or may have different shapes such as circular shapes.

As shown in FIG. 1(A), the grooves 22 are formed by the plurality of protrusions 323*d* in the through-hole 2 of the noodles 1 extruded from the die piece 3. Therefore, during boiling (in the case of raw noodles or dried noodles) or rehydration in hot water (in the case of instant noodles), inner surfaces of the grooves 22 can be brought into contact with hot water, accordingly increasing the area of the through-hole 2 placed in contact with hot water. This allows the hot water to penetrate the noodles 1 quickly. This results in noodles with a short boiling time or good reconstitution characteristics (short rehydration time).

Since the plurality of protrusions 323*d* are formed so as to have any of three-fold to eight-fold rotational symmetries as described above, a shape recessed toward the cross-sectional center of the noodle 1 can be provided between adjacent grooves 22 in the through-hole 2 of the noodle 1 extruded from the die piece 3 as shown in FIG. 1(A). This makes it easy to cause the through-hole 2 to close (see FIG. 1(B)) or contract (see FIG. 1(C)) due to water absorption and swelling of the noodles 1 during boiling or rehydration in hot water. This makes it possible to produce noodles which produce a good mouth feel during eating by eliminating an odd feeling which would be produced if the through-hole remained wide open.

Also, when the noodle 1 extruded from the die piece 3 is approximately 1.5 to 2 mm in diameter, preferably the tips 323*d'* of the cross-sectional shape of the plurality of protrusions 323*d* are at a distance of 0.5 mm or less from the cross-sectional center of the pin 323. Such a distance makes the noodles less liable to cracking and the like during drying, which may be caused if grooves 22 in the through-hole 2 of the noodle 1 are too deep. When the diameter of the noodle 1 is 3 mm, preferably the tips 323*d'* are at a distance of about 0.7 mm from the cross-sectional center of the pin 323.

When the noodles 1 have such a through-hole 2, the through-hole 2 closes or contracts due to water absorption and swelling of the noodles 1 during boiling or rehydration in hot water. Around the through-hole 2, the tissue of the noodle is discontinuous on opposite sides of the through-hole 2 as shown in FIGS. 1(B) and 1(C). If the tips 221 of the grooves 22 are placed close to the cross-sectional center of the noodle 1 (0.5 mm or less) as described above, the discontinuous portions in the noodle tissue can be reduced. Consequently, when the noodles are masticated by the eater, displacement is less liable to occur in the discontinuous portions, making it possible to provide noodles which produce a good mouth feel during eating.

Figure 5A:
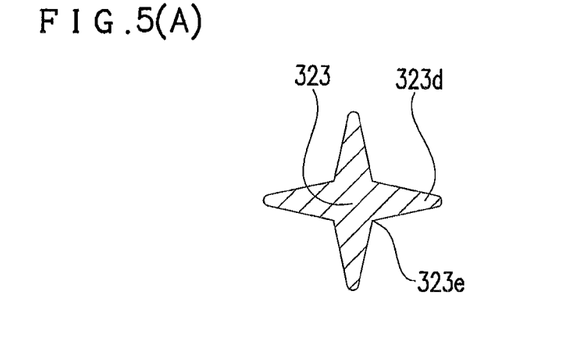
FIGS. 5(A) to 5(C) are enlarged lateral end views showing exemplary tips of pins according to another embodiment.
Figure 5B:
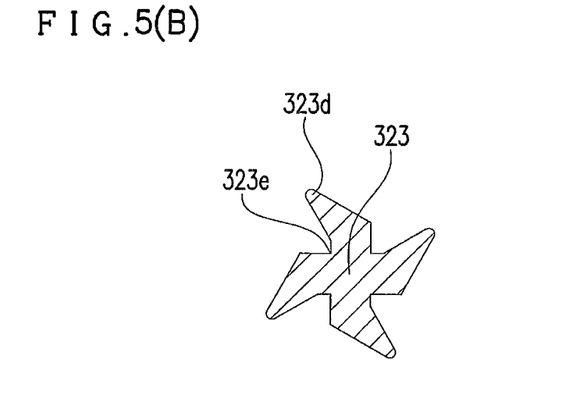
Figure 5C:
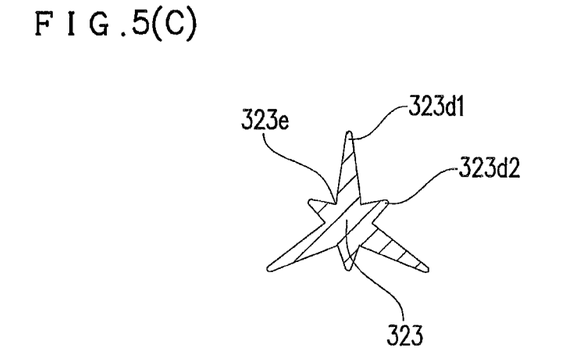

Other exemplary cross-sectional shapes of the tip 323*a* of the pin 323 will be described with reference to FIG. 5. The shape shown in FIG. 5(A) is a cruciform of four-fold rotational symmetry. The shape shown in FIG. 5(B) is also a cruciform of four-fold rotational symmetry, but is a modified cruciform, in which the protrusions 323*d* extend while being displaced in a circumferential direction rather than extending in the outer radial direction from the cross-sectional center as shown in FIG. 5(A). The shape shown in FIG. 5(C) is configured such that the protrusions 323*d* include large protrusions 323*d*1 and small protrusions 323*d*2. The set of large protrusions 323*d*1 and set of small protrusions 323*d*2 display respective three-fold rotational symmetries, and the large protrusions 323*d*1 and small protrusions 323*d*2 are arranged alternately. On the other hand, in a conventional die piece 500 shown in FIG. 7, a pin 503 has the form of a hollow pipe. The pin 323 may similarly have a hollow shape or may have a recess on the end face of the tip 323a. In this way, the tip 323a may have any of various cross-sectional shapes. As described above, rather than being hollow as is conventional the case, the pin 323 according to the present embodiment is solid, making it possible to create a large pin with a smaller cross section and high strength.

Various methods are available to manufacture the die piece 3 according to the present embodiment. Examples include a method which involves cutting the inlet-side piece 32 out of a single piece of metal blank by precision micromachining on a machining center. Thus, a noodle extruder die capable of forming thin noodles can be manufactured by a typical machine tool.

However, the die piece 3 according to the present embodiment is small. The pin 323 is formed integrally as part of the inlet-side piece 32. The pin 323 has a relatively complex shape, with the first base portion 323b being tapered, the second base portion 323c being cylindrical, and the tip 323a being "Y shaped." Consequently, higher machining accuracy is required than when the entire pin has a cylindrical or other simple shape. Thus, desirably the machine tool used for machining is a linear-motor driven machining center, which does not involve displacement (backlash) of cutting tools such as an end mill.

As a material for the piece 3, in the case of machine-cutting, various metal materials are available for use including brass, and stainless steel alloys, but non-metal materials such as resin are also available for use. Brass is used according to the present embodiment. Also, a cutting method other than machine-cutting may be used, and injection molding and sintering are conceivable. In that case, metals, resins, ceramics, and the like are available for use. Besides, the extrusion-side piece 31 and inlet-side piece 32 may be made of different materials or processed differently.

Figures 6A, 6C:
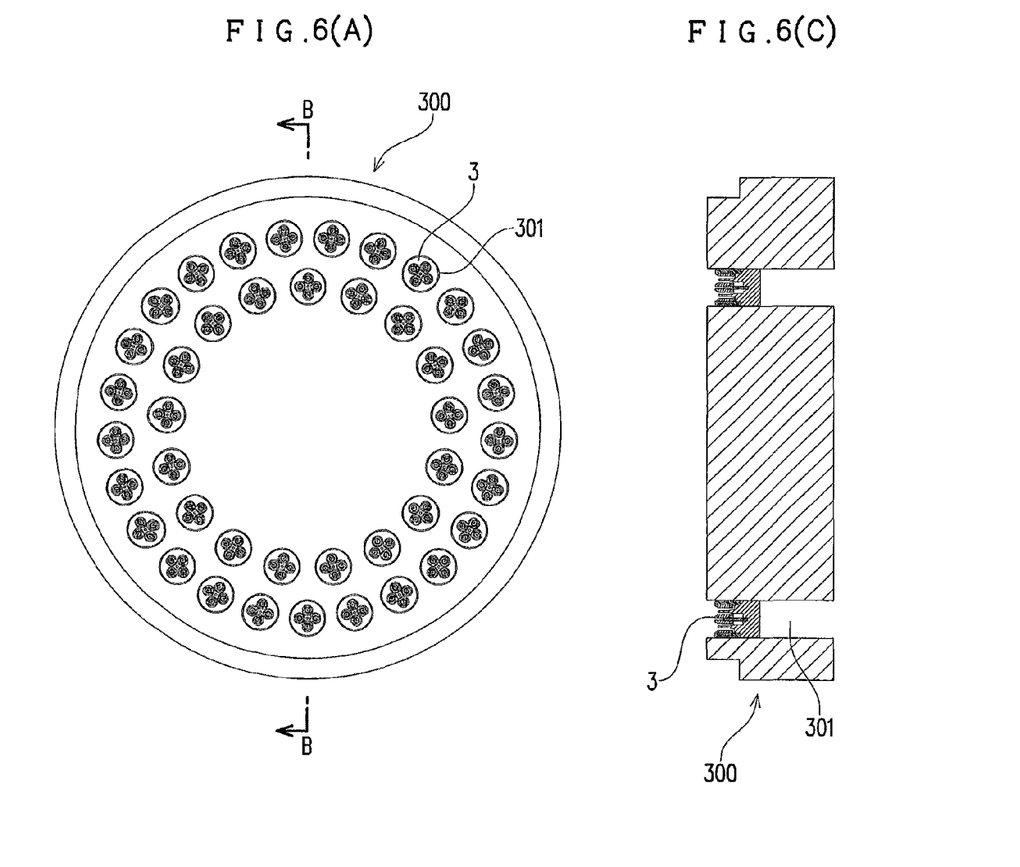
Figure 6B:
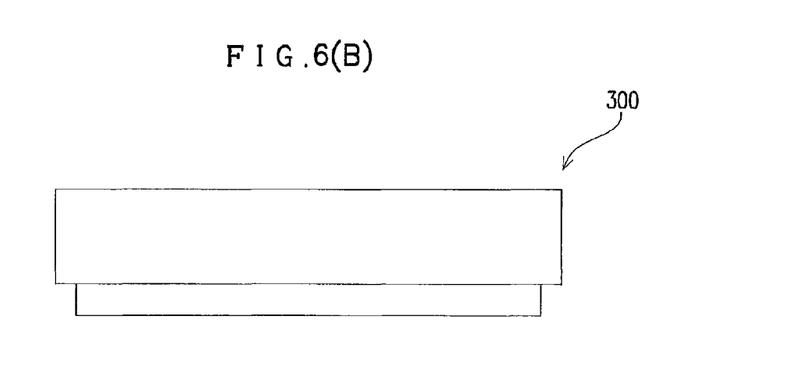

The die 300 equipped with the die piece 3 according to the present embodiment can have any of various shapes. An example is shown in FIG. 6. The die 300 in FIG. 6 is disk-shaped, and as shown in FIGS. 6(A) and 6(B), 17 through-holes 301 are formed on an inner peripheral side and 25 through-holes 301 are formed on an outer peripheral side, being arranged at regular intervals in a circumferential direction. The die piece 3 is mounted in each through-hole 301. Noodle dough is fed from the right side in FIG. 6(C), passed through the die pieces 3 and through-holes 301, and taken out as noodles 1 from the left side in FIG. 6(C). As shown in FIG. 6(A), the die pieces 3 are mounted in the die 300 such that the extrusion holes 311 of the die pieces 3 will be arranged along the circumferential direction and radial direction of the die 300. Also, the die piece 3 can produce not only long pasta, but also various types of extruded noodles.

The noodle dough pushed into the die piece 3 through the inlet hole 322 passes through the space 322a and then passes through the space 311a. Consequently, noodles 1 having the through-hole 2 in the longitudinal direction are formed, the through-hole 2 being identical in shape to the pin 323 ("Y shaped" in this example). Four noodles 1 are formed per _one die piece 3.

A cross-sectional shape of the noodle 1 extruded from the die piece 3 is shown in FIG. 1(A). An outer circumference of the noodle 1 has a circular cross-sectional shape. The through-hole 2 includes an air gap 21 formed in the cross-sectional center of the noodle 1 and plural grooves 22 formed rotationally symmetrically about a center of the cross section, extending in the outer radial direction (or radially outward) from the air gap 21. When plural grooves 22 are provided in this way, since hot water enters the grooves 22 during boiling or rehydration, the hot water can quickly penetrate the entire noodle 1. As shown, for example, in FIG. 1(B), the through-hole 2 closes or contracts due to swelling of the noodles 1 during boiling or rehydration in hot water. The through-hole 2 shown in FIG. 1(A) corresponds to the cross-sectional shape of the tip 323a of the pin 323 and has three grooves 22, forming a "Y shape."

Now, the background of the development of the present invention will be described. In developing new, thin, pierced, extruded noodles with a diameter of 3 mm or less such as spaghetti, the inventors proposed to form such a small through-hole in the noodles that will reduce the boiling time as well as the rehydration time in the case of instant noodles and will become almost closed at the time of eating as the noodles become swollen by absorbing hot water when the extruded noodles are boiled or rehydrated in hot water rather than remaining open, as with macaroni or bucatini, producing a peculiar mouth feel.

In this case, if a round through-hole is formed in the noodles, only such a small surface area is available on an inner surface of the hole that does not have much effect in reducing the boiling time and rehydration time or closing the hole. For this reason, the inventors considered configuring the shape of the hole to be formed such that grooves will be provided, extending radially from the center of the hole. However, a system in which the pin 503 is fitted in the inlet-side piece 501 such as shown in FIG. 7 has a problem in that the pin 503 is liable to fall out, bend, break, or the like as described above. Moreover, in order for the through-hole in the noodles to be provided with grooves, the pin 503 needs to be given a special shape and made extremely thin. Consequently, it is difficult to form a pin 503 having strength.

In view of this background, according to the present embodiment, the pin 323 of the die piece 3 is formed integrally as part of the inlet-side piece 32. Consequently, with the die piece 3 according to the present embodiment, the pin 323 does not fall out. In addition, the pin 323 is shaped to be thicker (that is, taper-like) at the base (first base portion 323b and second base portion 323c) than at the tip 323a, and thus has strength in spite of its thinness. Thus, the pin 323 is resistant to bending and breakage. This makes it possible to manufacture thin noodles 1 provided with the through-hole 2 of the above-described shape. The noodles 1 manufactured in this way have the effect of reducing the boiling time and rehydration time as described above and compares favorably with noodles without a through-hole in terms of the mouth feel produced at the time of eating.

Also, since the pin 323 is resistant to bending and breakage, the manufactured noodles are less prone to defects. This also provides high safety (foreign matter prevention and the like).

REFERENCE SIGNS LIST

1 Noodle
1a Depressed portion
2 Hole, hot-water passage hole
22 Groove
221 Tip of groove
3 Die piece
31 Extrusion-side piece
311 Extrusion hole
32 Inlet-side piece
322 Inlet hole
323 Pin
323a Tip of pin

323b First base portion of pin
323c Second base portion of pin
323d Protrusion of pin
323d' Tip of protrusion of pin

The invention claimed is:

1. An extruded noodle having a hole extending therethrough in a longitudinal direction, wherein:
   wheat flour is essential as a raw material for the noodle;
   the hole closes or contracts during boiling or rehydration in hot water;
   the hole in a cross section of the noodle is configured such that a plurality of grooves are formed rotationally symmetrically about a center of the cross section, extending in an outer radial direction from the center of the cross section of the noodle;
   the hole having an air gap at the center of the cross-section of the noodle, wherein the plurality of grooves are located adjacent to each other in a circumferential direction of the noodle and are within the noodle, and further wherein the plurality of grooves open to the center of the cross section of the noodle to form the air gap; and
   the hole closes during boiling or rehydration in hot water, or contracts to such an extent as to allow the grooves excluding the air gap to be closed.

2. The extruded noodle according to claim 1, wherein the hole is formed so as to occupy 2% to 15% of a sectional area of the noodle including the hole.

3. The extruded noodle according to claim 1, wherein tips of the plurality of grooves reach positions 30% to 70% of a distance from the center of the cross section of the noodle to an outer peripheral edge of the noodle.

4. The extruded noodle according to claim 1, wherein the hole in the cross section of the noodle is shaped to have a depressed portion which is located between tips of adjacent ones of the plurality of grooves and is recessed toward the center of the cross section of the noodle.

5. The extruded noodle according to claim 1, wherein tips of the plurality of grooves have a curved surface.

6. The extruded noodle according to claim 1, wherein the groove has a width decreasing toward the radially outward side.

* * * * *

UNITED STATES PATENT AND TRADEMARK OFFICE
CERTIFICATE OF CORRECTION

PATENT NO. : 10,561,163 B2
APPLICATION NO. : 13/996156
DATED : February 18, 2020
INVENTOR(S) : Mitsuru Tanaka et al.

It is certified that error appears in the above-identified patent and that said Letters Patent is hereby corrected as shown below:

In the Claims

Column 19, Line 15, Claim 1, delete "noodle;" and insert -- noodle, wherein the cross section of the noodle has a circular outer shape; --

Column 19, Lines 19-20, Claim 1, after "noodle," delete "and further"

Column 19, Line 22, Claim 1, after "and" insert -- further wherein the plurality of grooves are formed so as to have three-fold to four-fold rotational symmetries; --

Signed and Sealed this
Fifth Day of May, 2020

Andrei Iancu
*Director of the United States Patent and Trademark Office*